Nov. 18, 1941.  C. D. KLAUBER  2,263,174
ELECTRIC HEATER
Filed July 13, 1940  2 Sheets-Sheet 1
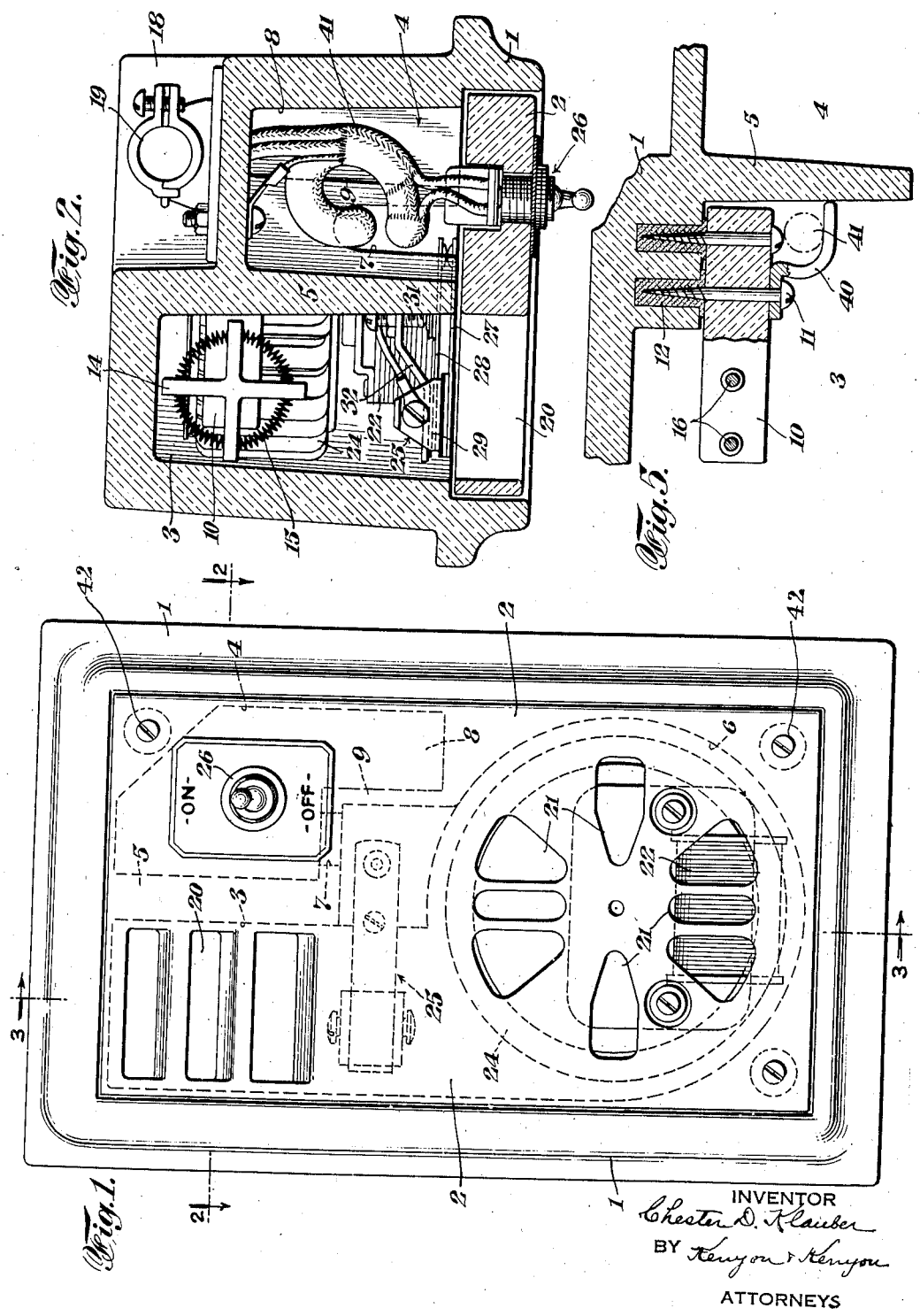
INVENTOR
Chester D. Klauber
BY Kenyon & Kenyon
ATTORNEYS Nov. 18, 1941.                C. D. KLAUBER                2,263,174
                              ELECTRIC HEATER
                           Filed July 13, 1940              2 Sheets-Sheet 2
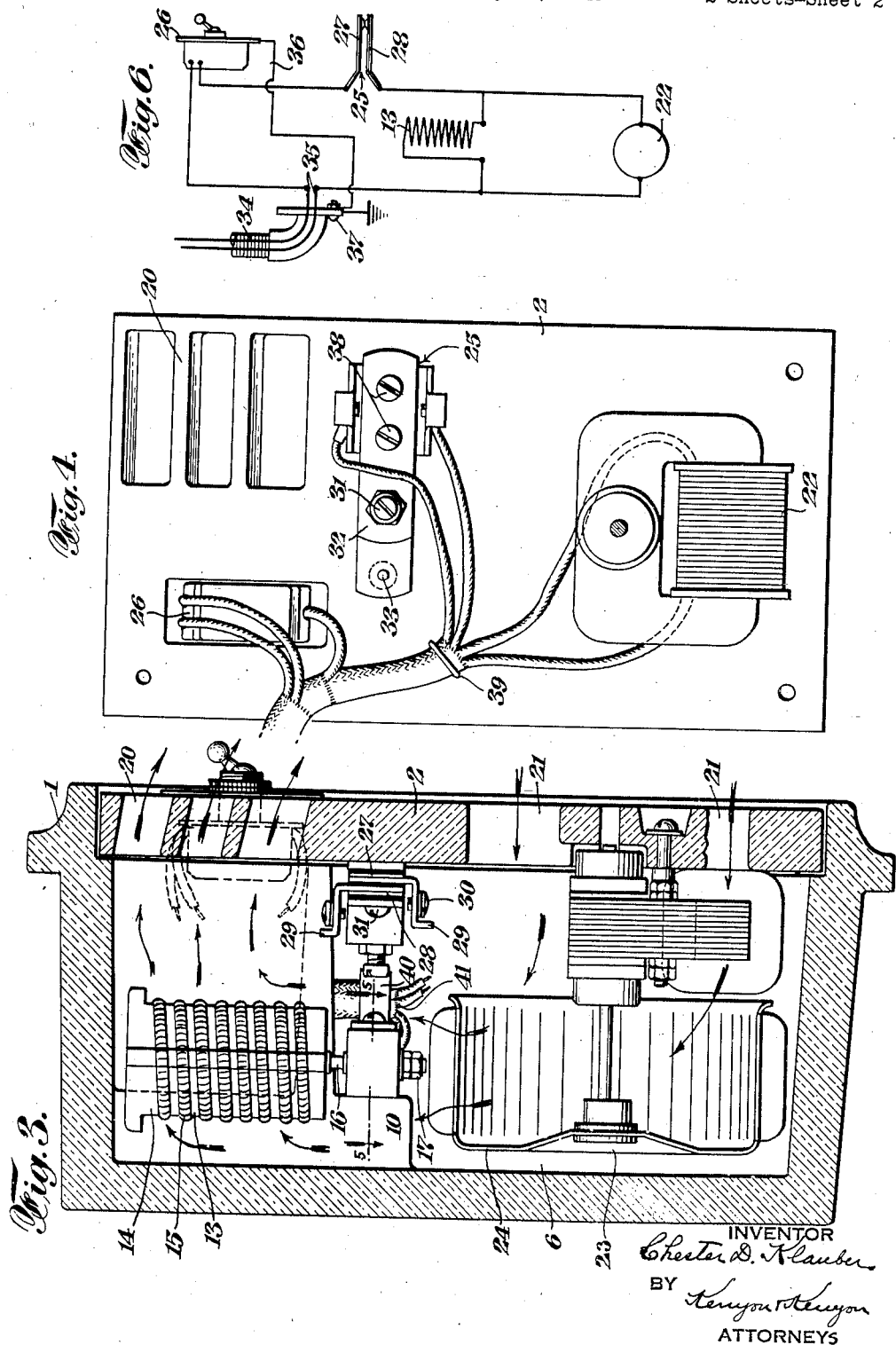
INVENTOR
Chester D. Klauber
BY
Kenyon & Kenyon
ATTORNEYS Patented Nov. 18, 1941

2,263,174

UNITED STATES PATENT OFFICE 2,263,174

ELECTRIC HEATER

Chester D. Klauber, New York, N. Y., assignor to The Fairfacts Company, Inc., New York, N. Y., a corporation of New York Application July 13, 1940, Serial No. 345,265

5 Claims. (Cl. 219—39)

My invention relates to electric heaters of the wall-insert type in which a motor-operated fan is incorporated for the purpose of circulating a current of air through the heater and discharging it therefrom in heated condition, and is more particularly designed to furnish auxiliary heat where required, as, for instance, in a bathroom.

An object of the invention is to provide an improved, compact and simple built-in or recessed electric heater adapted to be permanently mounted in the wall of a room in such a way as to be practically integral therewith, one which is easy of installation and is operated by a single switch.

Another object of the invention is to provide an electric heater in which the motor with its attached fan, the heating element, thermostat and switch, forming parts thereof, are so mounted that they are readily accessible for any need that may develop.

Another object of the invention is an electric heater having structural features which, while utilized to attain the results sought, are designed for the production of a device of the type described at a minimum cost.

Another object of the invention is the provision of an electric heater in which the motor-operated fan and the heating element are so mounted with respect to each other and other parts of the heater that, while the air drawn in by the fan tends to cool the motor, it is, after becoming charged with heat by circulation through a tangential path to and around the element, immediately expelled without, in its heated condition, coming in contact with the motor.

Another object of the invention is the provision of a thermostat in the heater which controls both the heating element and the motor so that neither can be operated independently of the other.

Further objects and advantages of the invention will appear from the following specification.

Referring to the drawings forming part hereof in which like reference characters represent corresponding parts, Figure 1 is a front view of the heater showing some of the parts in dotted lines;

Figure 2 is a horizontal section taken substantially on the line 2—2 of Figure 1;

Figure 3 is a vertical section taken substantially on the line 3—3 of Figure 1;

Figure 4 is a rear view of the front panel;

Figure 5 is a fragmentary section taken on the line 5—5 of Figure 3; and

Figure 6 is a diagram of the electric circuit.

As will be seen from the drawings, the heater, which is preferably constructed of ceramic material, includes a substantially rectangular casing which comprises a housing 1 open at the front, and a grille panel 2 for closing said front and adapted to be removably attached thereto. The upper part of the casing is divided into two compartments, 3 and 4, by a partition 5, the lower part of the casing constituting a chamber 6 for the accommodation of the motor and fan hereinafter described. Separated from the partition 5 by a narrow slot 7, shown in dotted lines in Figure 1, is a pocket 8 formed by wall 9, which extends forward from the back of the housing, and the adjacent side wall of the housing, the bottom of the pocket being formed by the wall of the chamber which curves upward and terminates at wall 9, the said wall of the chamber being partly cut away at that point to permit the mounting of block 10. This block is attached by means of screws 11 threaded into lead shields 12 to the part of the wall of the chamber which is not cut away. It is spaced from both the front and rear walls of the casing and is so mounted immediately below the partition 5 that it does not extend entirely across the open end of compartment 3, but a space is left between its end and the adjacent wall. Attached to it by one of the screws 11 is bracket 40. This bracket is so positioned that it is located at the entrance to compartment 4, and holds or secures the interior wiring at that point.

Mounted in compartment 3 on block 10, and spaced from the walls surrounding it, is heating element 13. It consists of an X-shaped ceramic core 14 around which a helically coiled resistance wire 15 is wound and secured to it by notches in its edges. Brass pins 16 secured in the core are plugged into receptacles in the block 10 and connected with wire connection screws 17.

The compartment 4 is designed for the assembly and retention of the wires which are led thereto for connection to the source of supply so as to prevent them from becoming entangled with parts of the heater. These wires must have considerable slack, for the reason to be explained, and provision is therefore made for taking care of it in such a way as not to hamper the operation of the heater. This is accomplished by compartment 4 in conjunction with pocket 8 which opens into said compartment, the said two members co-operating to provide means for holding the conduit cable and wires after the necessary connections have been made, together with such looseness or slack in them as may be requisite.

The interior wires are held at the entrance to compartment 4 by bracket 40 and are led into said compartment through slot 7.

To the back of the housing, substantially coincident with compartment 4, a metal plate 18 is attached through the hole 19 in which the supply cable is connected.

The front panel grille 2 has in its upper part a number of hot-air outlets 20 and in the lower part a series of cold-air intakes 21. On the back of the grille and arranged to project into the chamber 6 is mounted a motor 22 provided with a shaft 23 on which is secured a centrifugal fan 24. Above the motor and so located on the panel, from which it is insulated, that when the latter is in place it will be position just below the heating element, is thermostat 25. A switch 26, operable from the front of the panel, is located in a recess in the back of the panel. A brass eyelet 39 is also attached to the back of the panel for the purpose of holding the interior wiring away from the fan blades.

The motor and its attached fan do not occupy the entire space in the chamber but are so mounted that between the fan and the walls adjacent thereto there is formed a passage for air currents. As a continuation of this passage is defined by the spaced mounting of the block 10, thermostat and heating element, it will be obvious that a tangential path of travel is thus procured for the fan-accelerated air from the chamber, past the said block and thermostat and around the heating element and then through outlets 20.

The thermostat, the members of which are suitably insulated from each other, is mounted in the panel by screws 38. In the form shown, the bimetallic strip is indicated by 27, the panel being recessed behind it to allow for its operation, the contact arm by 28 and connection tabs having upturned lugs by 29, the said lugs being equipped with screws 30 for the attachment of wires thereto. The adjusting screw is shown at 31 mounted in bracket 32, said bracket being fastened to the panel by the screws 38 with other elements of the thermostat, and contact button at 33 in arm 28. The said arm is adapted to be held in contact with strip 27, thus providing a normally closed circuit.

The heating element, motor, thermostat and switch are connected as shown in Figure 6 in which 34 indicates the conduit cable or source of supply, and 35 the wires leading thereto. The grounding lead is designated 36, one end as shown being connected to the switch nipple and the other seated under bolt 37 connecting plate 18 to the heater. The heating element and motor are so interconnected that neither can be operated independently of the other. The operation is as follows: The switch is moved to the "on" position and the thermostat being in normally closed position, the motor is operated and the element energized. The fan is at the same time set in motion. Air being thus caused to circulate, cool air is drawn in around the motor through intakes 21 and impelled upward along the path already designated. The heating element being spaced from the walls of the heater, the draft thus set up causes the cool air forced upward to circulate around the element, becoming charged with heat and to be then expelled through the outlets 20.

If for any reason the motor should stall, the thermostat will operate and disconnect the heating element. Should the element exceed the maximum set for it, the same result will follow, the motor being thereby disconnected by the breaking of the circuit through the thermostat. On the resumption of the motor, or drop in temperature to the degree required, the thermostat will again assume its normally closed position and the heater will operate as before.

Should it become necessary to inspect any interior part of the heater, this can be readily done by removing the three screws 42 which hold the panel grille to the housing. For this purpose, it is necessary when the heater is installed in the wall of a room that enough slack be left in the connecting wires to permit the grille to be moved away from the housing a reasonable distance without breaking the connections. It is for the storage or safeguarding of this slack or the loose wires that the pocket 8 is provided in conjunction with compartment 4.

From the foregoing, it will be seen that the invention comprises a structure of great simplicity. Its various elements are advantageously combined in a minimum space, and can be easily reached for inspection or repair by the detachment of the front panel secured to the housing by the three screws 42. The placement of a partition between the compartments for the heating element and wiring prevents the wires or cable from being affected by the radiant heat, and said heat is also intercepted by the element-mounting bar for the protection of the motor. It will be evident too, that the arrangement illustrated prevents the heat from being dissipated. This is due to the fact that air is confined to a definite path of travel and is at once forced through the exits at the end of that path as soon as it has taken up its charge of heat.

I claim:

1. An electric heater having, in combination, a casing comprising a housing open at the front, a grille removably attached to the front of the same, a vertical partition integral with and substantially one-third the length of the housing extending from the rear to the front thereof dividing the upper part of the housing into two compartments and adapted to contact with the said grille, intake openings in the lower part and outlet openings in the upper part of said grille, the lower part of the casing constituting a chamber, a heating element, spaced from the partition and walls of the casing, mounted in one of said compartments opposite said outlet openings; wiring means in the other of said compartments, a motor mounted in the said chamber opposite the intake openings, and a fan operable by the motor to impel air through the intake openings and expel it through the outlet openings.

2. An electric heater having, in combination, a casing comprising a housing with an open front and a grille with openings at the top and bottom thereof for removable attachment to the housing, the housing having a partition extending to about one-third its length from the top thereof and integral therewith dividing the upper part of the housing into two compartments, the lower part of the housing constituting a chamber, a heating element mounted in one of said compartments, the other compartment adapted to receive the interior wiring for attachment to the source of supply, the grille having mounted on the back thereof of a motor, a fan connected to it, a thermostat, and a single switch operable from the front of the grille, the motor, when the grille is connected to the housing, being positioned opposite the openings in the lower part of the grille and the thermostat positioned adjacent the heating element, the openings in the upper part of the grille being then opposite the heating element, substantially as and for the purposes described.

3. An electric heater having, in combination, a casing, the upper portion of which is divided into two compartments by a partition integral therewith and extending to about one-third its length, the lower portion of the casing constituting a chamber, outlet openings in one of said compartments, a bar at the lower end of said compartment, an electric heating element mounted thereon, wiring means for attachment to a source of supply in the other compartment, a wire holding bracket at the entrance to this compartment, and walls forming a pocket which opens into said last-mentioned compartment, a motor in the chamber, and a fan connected to the motor, intake openings in the casing opposite said motor and attached fan, the said fan, bar and heating element being so spaced from the walls adjacent to them as to provide a path for transmission of air impelled through the said intake openings to the said outlet openings, substantially as described.

4. In an electric wall insert heater, a housing, a vertical partition integral therewith dividing the upper part of the housing into two compartments, the lower part of the housing constituting a chamber, said partition extending to about one-third the length of the housing, a heating element in one of said compartments, wiring means for connection to a supply source in the other compartment, and a motor with attached fan mounted in said chamber, a cut-away portion at the base of the wiring compartment forming a slot through which said wiring means are connected to the heating element and motor, walls integral with the housing forming a pocket which opens into said wiring compartment, said pocket adapted to co-operate with said wiring compartment to prevent the wiring means from contacting with the fan, and a grille having openings opposite the heating element and motor and adapted to be removably attached to the said housing substantially as and for the purpose described.

5. In an electric heater of the character described, the combination of a housing, a vertical partition integral therewith dividing the upper part of the housing into two compartments, the lower part of the housing forming a chamber, a pocket formed by walls integral with the housing positioned below and opening into one of the compartments, a wire-holding bracket adjacent thereto, said pocket and last-mentioned compartment adapted to receive and hold in place wiring means, the floor of said last-mentioned pocket being cut away in part to form a slot, a bar spaced from the walls of the housing adjacent thereto extending across the open end of the other compartment on which is mounted a heating element, a motor with attached fan mounted in the chamber of the housing, and a grille having openings opposite the heating element and the motor and adapted to be removably attached to the said housing, substantially as and for the purpose set forth.

CHESTER D. KLAUBER.